Aug. 21, 1923.
A. B. BROLUSKA ET AL
1,465,251
ELECTRIC MACHINE
Filed July 6, 1920
5 Sheets-Sheet 1
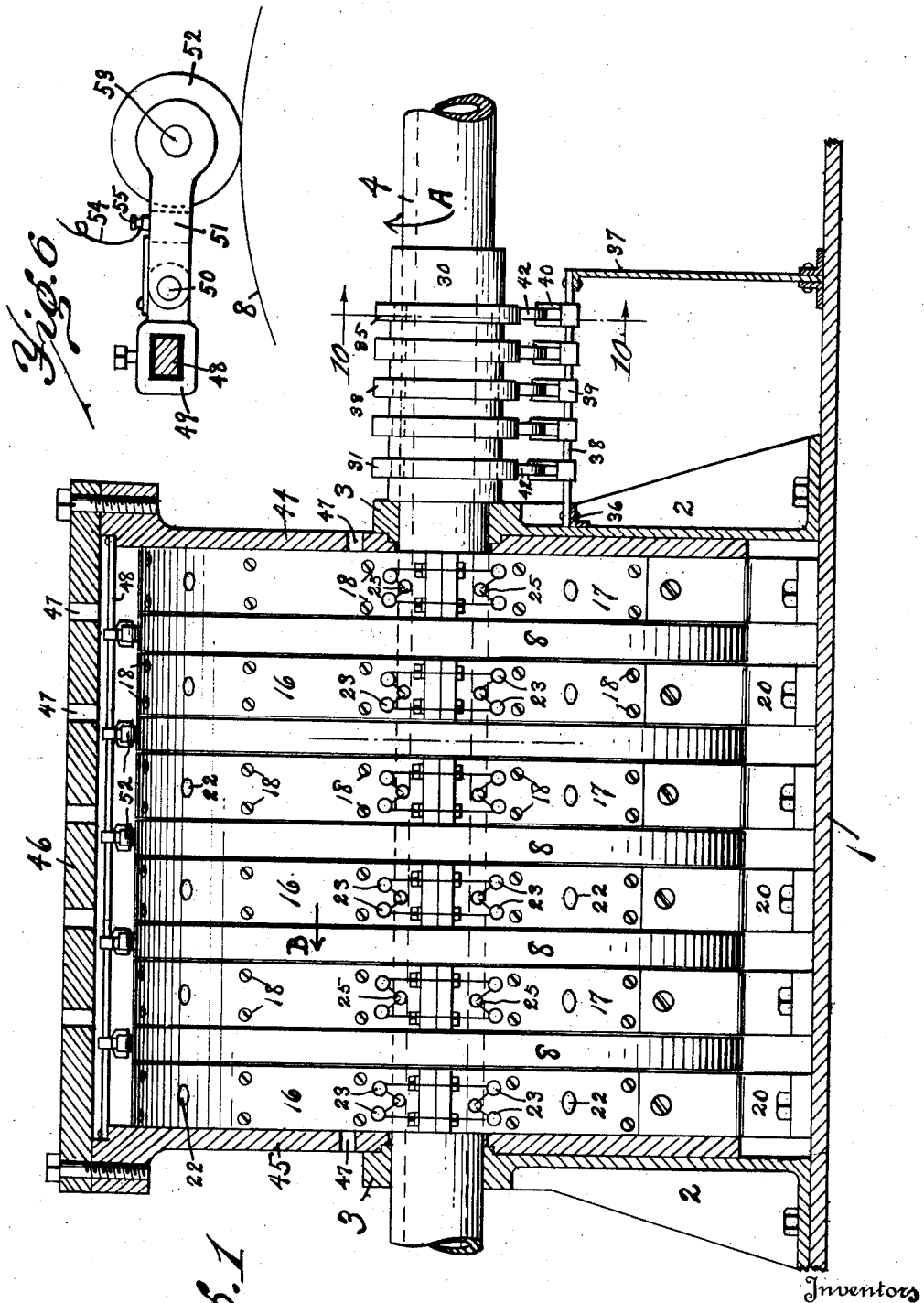
Inventors
Amel B. Broluska
& Harry A. Broluska.
By Edward N. Pageluew
Attorney

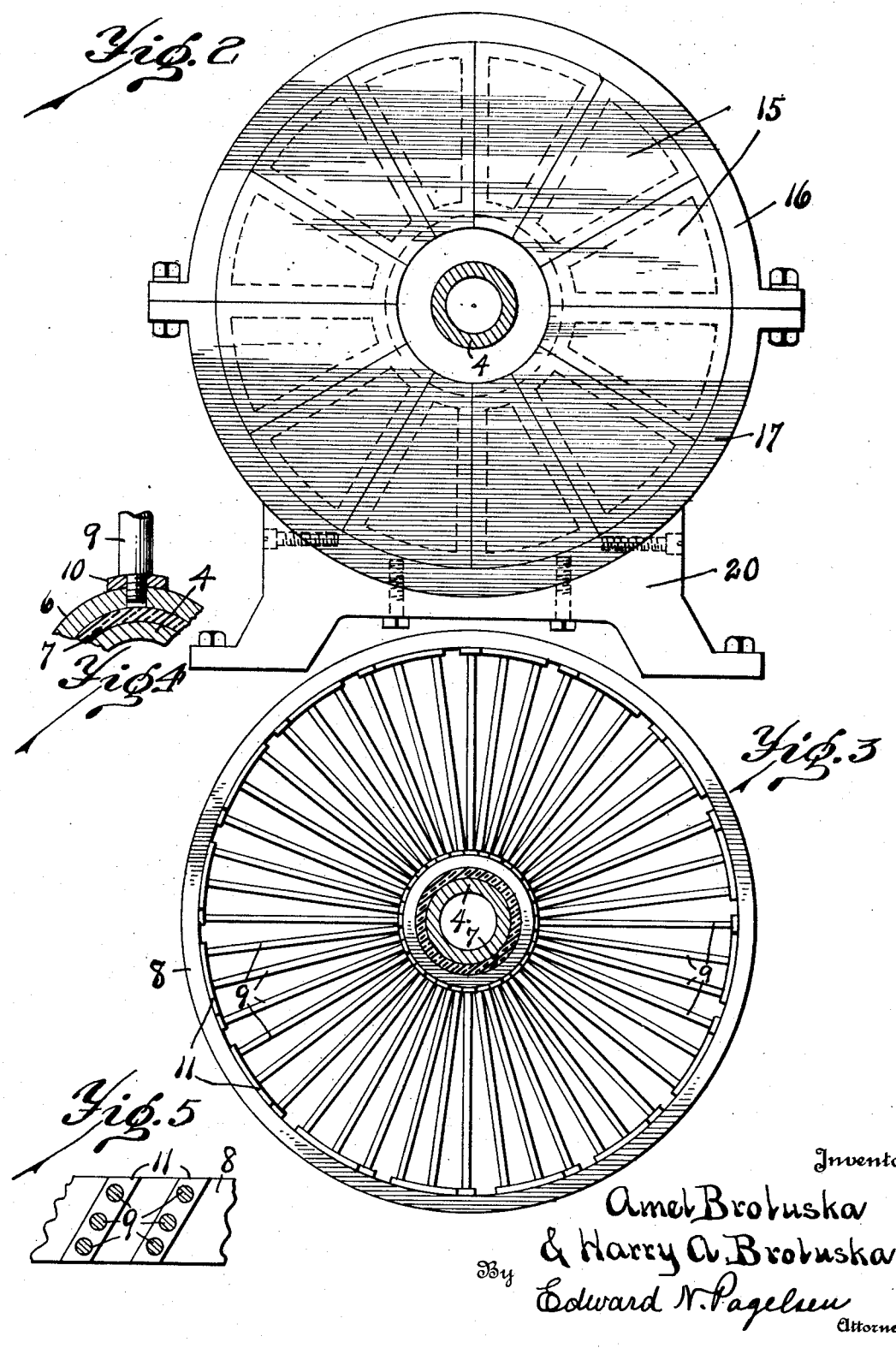

Aug. 21, 1923.
A. B. BROLUSKA ET AL
ELECTRIC MACHINE
Filed July 6, 1920
1,465,251
5 Sheets-Sheet 3
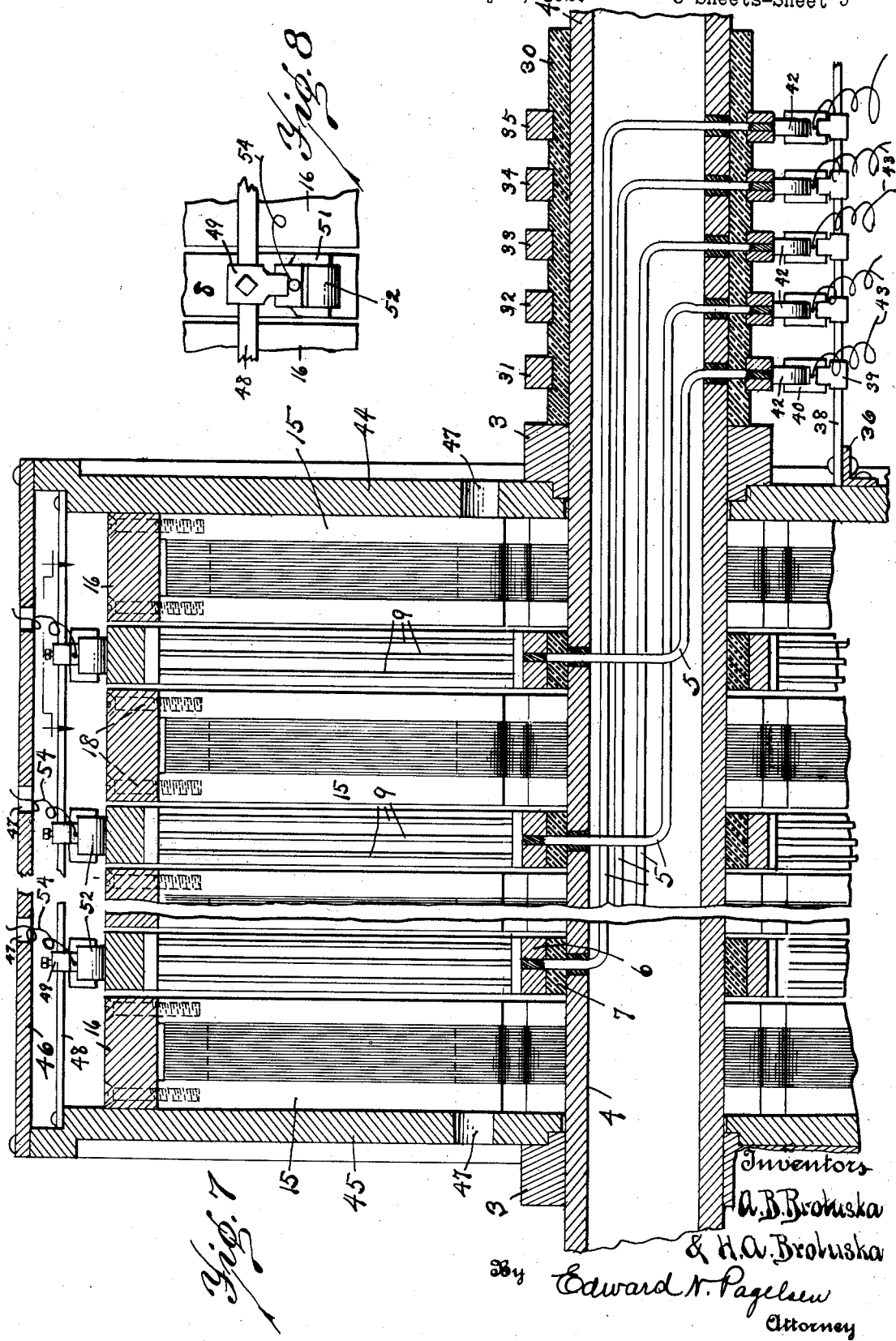

Aug. 21, 1923.
A. B. BROLUSKA ET AL
1,465,251
ELECTRIC MACHINE
Filed July 6, 1920     5 Sheets-Sheet 4
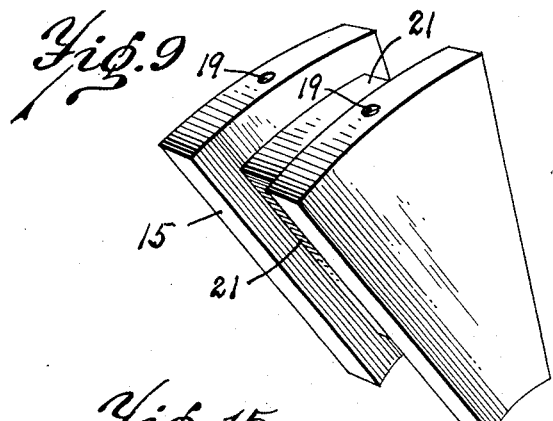
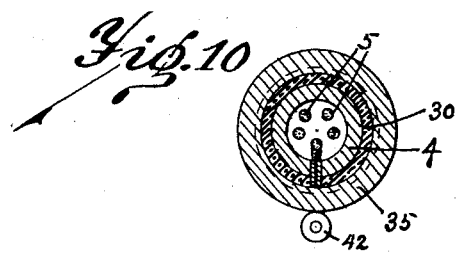
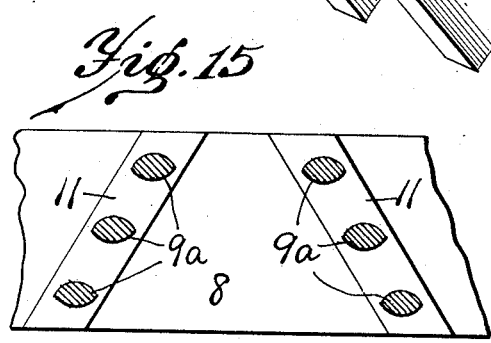
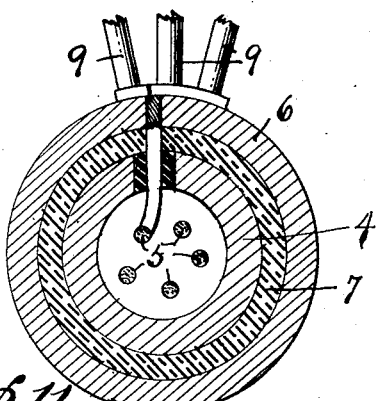
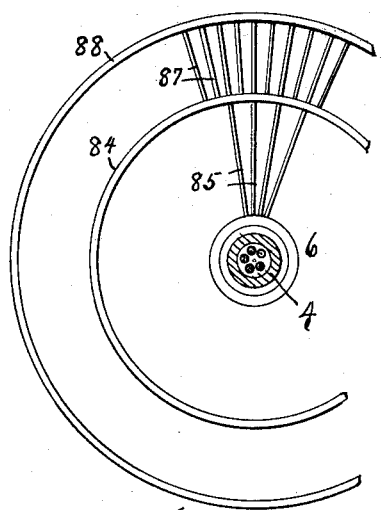
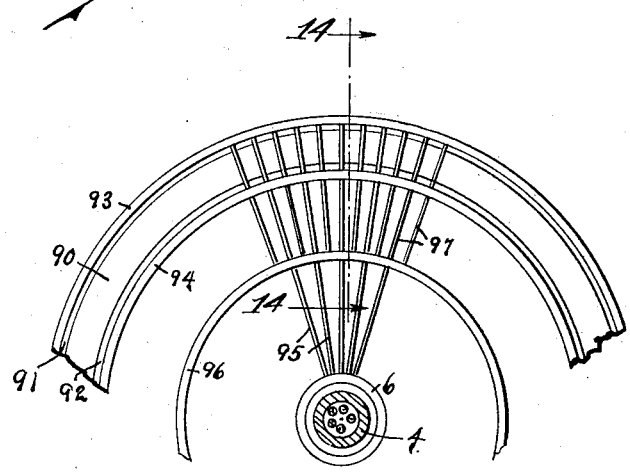
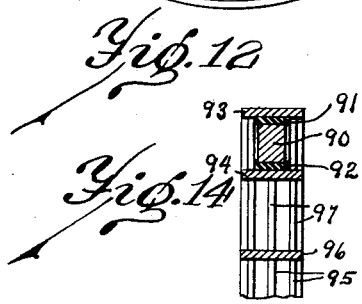
Inventors
Arvel B. Broluska
& Harry A. Broluska.
By Edward N. Pagelsen,
Attorney Aug. 21, 1923.
A. B. BROLUSKA ET AL
1,465,251
ELECTRIC MACHINE
Filed July 6, 1920
5 Sheets-Sheet 5
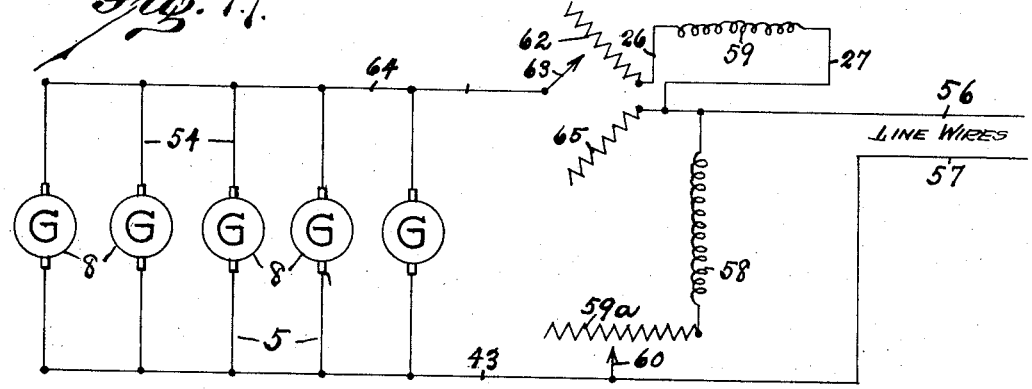
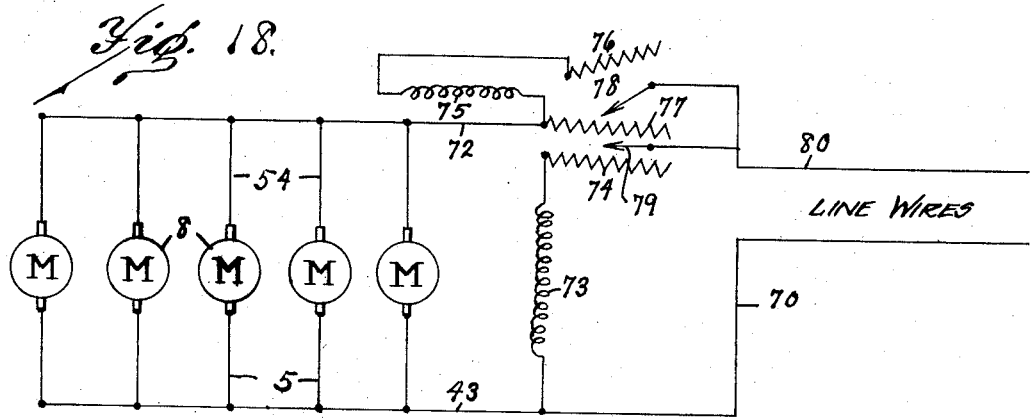
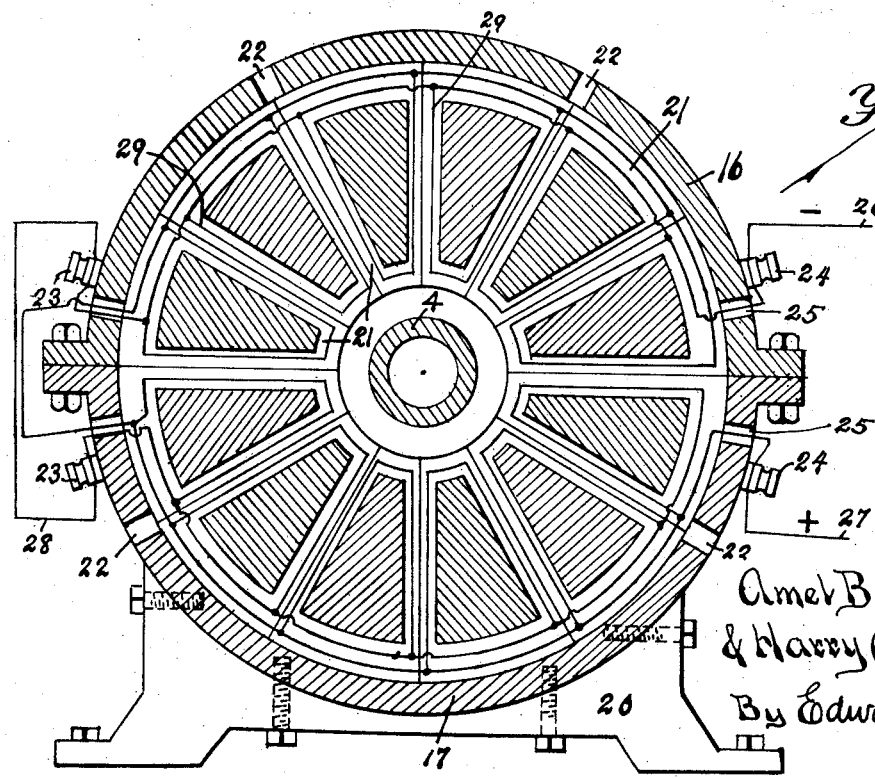
Inventors
Amel B. Broluska
& Harry A. Broluska.
By Edward N. Pagelsen
Attorney Patented Aug. 21, 1923.

1,465,251

UNITED STATES PATENT OFFICE.

AMEL B. BROLUSKA AND HARRY A. BROLUSKA, OF DETROIT, MICHIGAN, ASSIGNORS OF ONE-THIRD TO CYRIL CAILLIAU, OF DETROIT, MICHIGAN.

ELECTRIC MACHINE.

Application filed July 6, 1920. Serial No. 394,123.

*To all whom it may concern:*

Be it known that we, AMEL B. BROLUSKA and HARRY A. BROLUSKA, citizens of the United States, and residing at Detroit, county of Wayne, and State of Michigan, have invented a new and Improved Electric Machine, of which the following is a specification.

This invention relates to the construction of electric machines, both generators and motors, and its object is to provide an electric machine, which, when used as a dynamo, will generate a constant direct current without the use of a commutator and in which the current is neither interrupted nor reversed in any of its windings or conductors, and in which, when used as a motor, a direct current will flow without interruption or reversal through each conductor and winding so long as the motor turns in the same direction.

This invention consists, in combination with a base and a rotatable shaft supported thereon, of a series of magnet holders mounted on the base and electro-magnets mounted in each of the holders, the cores of the magnets being straight and positioned parallel to the shaft, the windings of all the magnets being in the same direction so that the magnetic flux will be in the same direction parallel to the shaft in all of the magnets, of a housing connecting the outer ends of the two end series of magnets so as to close the path of magnetic flux, of a rotor rigidly mounted on the shaft between each two series of magnets and consisting of an exterior or bearing ring and a series of wires or bars extending from the shaft to said ring, and proper conductor wires for the current.

It further consists in providing the shaft with a central passage to receive the conductors leading to the rotors, in mounting a conductor ring on the shaft outside of the bearings for each rotor, in connecting a ring to each conductor, and in providing a contact for each ring.

It also consists in forming the ends of the magnet cores segmental so that when placed together they will constitute an annulus in which each supports the other, and in enclosing said magnets in a band or ring.

It also consists in the details of construction illustrated in the accompanying drawings and particularly pointed out in the claims.

In the drawings, Fig. 1 is a front elevation of this improved electric machine with a portion of the housing broken away. Fig. 2 is a side elevation of a magnet unit and its support. Fig. 3 is a side elevation of a rotor. Fig. 4 is a section showing the connection between a rotor element and the shaft. Fig. 5 is an elevation of a connector between the outer ends of the rotor elements and the outer ring. Fig. 6 is a central section of a bearing roller. Fig. 7 is a central section of this machine. Fig. 8 is a plan of another bearing roller. Fig. 9 is a perspective of a magnet core. Fig. 10 is a transverse section of a bearing ring on the main shaft. Fig. 11 is a transverse section of the hub of a rotor. Figs. 12 and 13 are diagrammatic side elevations of modified forms of rotors. Fig. 14 is a section on the line 14—14 of Fig. 13. Fig. 15 is a plan of a connector plate showing rotor bars of flattened cross section. Fig. 16 is a vertical transverse section with the field windings indicated diagrammatically. Fig. 17 is a winding diagram when the invention is embodied in an electric generator. Fig. 18 is a similar diagram when the invention is embodied in a motor.

Similar reference characters refer to like parts throughout the several views.

The present invention may be embodied in either electric generators or motors, the novel constructions being adapted for either, the rotor bars being made somewhat heavier for motors than for generators. In both, the electro-magnets are arranged around the axis of the rotors, and in both, the windings of these magnets cause electro-magnetic lines of force which are the same in direction throughout the fields, and in the fields are parallel to the axis of the shaft on which the rotors are mounted.

The machine illustrated diagrammatically in the drawings is shown mounted on a base 1 on which the pedestals 2 for the bearings 3 of the shaft 4 are mounted. Any desired means may be employed to rotate or receive power from this shaft. The shaft is preferably hollow to receive conductor wires 5 which connect to the hubs 6 of the rotors.

These hubs are insulated from the shaft by means of sleeves 7 of mica, gutta percha, indurated fibre or other suitable means.

Extending from the hubs 6 to the collector rings 8 are the bars 9 which are preferably positioned in diagonal rows, as indicated in Fig. 5, and have plates 10 and 11 at their inner and outer ends which attach to the hubs 6 and collector rings 8 respectively. The arrangement of these bars is a matter of choice, as they may be staggered as are the bars 9ª in Fig. 15, or in parallel groups as indicated in Fig. 5, and their cross section may vary from round to that shown in Fig. 15.

In Fig. 9 is shown one of the cores 15 of the preferred form of field magnets although any other construction which may be desired may be substituted therefor. These magnets when wound are secured together by the two parts 16 and 17 of a magnet holder for each field, there preferably being one more field than rotors. The ends of the cores are so formed that when the two parts of the holders are secured together, each magnet is held rigidly in position. For greater security, the screws 18 may be employed to hold the magnets, holes 19 being threaded to receive the screws. Each holder is preferably provided with a foot 20, either integral with or separate from the lower part 17.

The parts of the holders are formed with holes 22 to permit air to escape, and the grooves 21 around the cores are made deeper than the thickness of the winding so as to permit free circulation of air from the central passage through which the shaft extends to the holes 22. Binding posts 23 and 24 are mounted on the magnet holders and the holes 25 permit the lead wires 26 and 27 and connector wires 28 for the magnet windings to pass through as indicated in Fig. 16. The lead wires 26 and 27 preferably extend around inside of the holders and the individual windings 29 may connect thereto. It is to be understood that these magnets may be connected in series or in parallel or may be compound wound. Also that the statement that the shaft and the rotors rotate is merely relative as the fields may be rotated around a stationary shaft, or the rotors and field may turn in opposite directions.

On the shaft 4 is mounted a sleeve 30 of insulating material and on this sleeve are mounted the contact rings 31 to 35 inclusive and these rings are connected to the several hubs 6 of the rotors by means of the wires 5. Adjacent these rings 31 are the supports 36 and 37 for the cross bar 38 on which are mounted the brackets 39 either insulated therefrom or of insulating material. To these brackets are secured the yokes 40 which are provided with pins in their outer ends on which the contact wheels 42 are mounted. The yokes and the wheels are in circuit with the wires 43 which may be considered as continuations of the wires 5. The rollers and their supports are substantially as shown in Figs. 6 and 8 to be explained later on.

The housing of the machine consists in two heads 44 and 45 which are held tightly against the end magnets and magnet holders, and their peripheries connect to the outer shell 46 in any desirable manner. The magnetic flux passes through the magnets parallel to the shaft from one of the heads to the other and then to the outer shell and then back through the outer shell to the first head, thus completing the circuit between the outer ends of the two outer fields or groups of electro-magnets. The heads and shell have ventilating openings 47.

Within the shell and secured to the heads we prefer to mount a rod or bar 48 on which are mounted brackets 49 similar to those just described. These brackets carry pins 50 on which are mounted the yokes 51 which carry the wheels 52 on the pins 53. Conductor wires 54 extend from the binding post 55 on these yokes. It will be understood that the sets of rollers which engage the connector rings as well as the rollers which engage the rings 31 to 35 inclusive on the shaft 4 may be duplicated for each ring if desired.

In Figs. 17 and 18 we have shown the windings diagrammatically. The line wires 56 and 57 in Fig. 17 extend from the generator, the wire 57 being connected to the wires 43 and 5. The field windings 58 are shunt windings while the windings 59 are series windings. A resistance 59ª is connected to the shunt winding 58 and a movable contact 60 is connected to the wire 57 so that the amount of resistance between the shunt field winding 58 and the line wire 57 may be varied. The resistance 62 is similarly connected to one end of the series field winding 59 and a variable contact 63 is connected to the wires 54 by means of the wire 64 and may be so positioned as to vary the amount of resistance between the series field winding and the wires 54. If desired, a third resistance 65 may be connected directly to the wire 56 and so positioned that it may be engaged by the movable contact 63 so that the series field windings 59 may be entirely cut out and the desired amount of resistance between the wires 54 and the line wire 56 may be obtained. This system is especially adapted for generators and it will be understood that each of the circles enclosing the letter G represents a rotor of this machine.

Fig. 18 illustrates diagrammatically the windings of a motor. In this case each circle enclosing the letter M diagrammatically represents a rotor to which the wires 5 and 54 are connected. The line wire 70 connects to the conductor wires 43 and a wire 72 connects to all the conductor wires 54. The shunt field winding 73 connects to the wire 70 at one end and may be attached to a resistance coil 74 at the other. The series field winding 75 connects to the wire 72 and is also connected to the resistance 76. An additional resistance 77 may be connected to the wire 72, while movable contacts 78 and 79 connect directly to the line wire 80.

It will be observed that the movable contacts may be so positioned as to increase or diminish the resistance between the shunt or the series windings and the line wires, or to cut out either of them as may be desired.

When the machine is designed as a generator and the shaft is rotated as indicated by the arrow A in Fig. 1 and the windings of the magnets are such and so connected as to cause magnetic lines of force to flow in the direction of the arrow B, current will be caused to flow over the wires 43, collars 31 to 35 inclusive, hubs 6 of the rotor, out the bars 9 to the collector rings 8, rollers 52 to the wires 54 and 64, contact 63, resistance 62, series field winding 59, wire 27 and in part over the line wire 56 and in part over the shunt field winding 58 back to the wires 43. The strength of the fields will be determined by the resistances 59$^a$, 62 and 65 and the movable contacts engaging therewith. At no time is the current in any of these parts interrupted or reversed, which makes for a minimum of heating and great steadiness of output.

Instead of the bars 9 extending out from the hubs 6 directly to the collector rings 8, an intermediate collector ring 84 may be employed, as shown in Fig. 12, the inner bars 85 extending from the hubs 6 to these rings and the outer bars 87 extending to the collector rings 88. The bars 87 are more numerous than the bars 85, which results in a more steady current when used in a generator and a more steady pull when used in a motor.

In Figs. 13 and 14, an annular iron core 90 is mounted between auxiliary ring 93 and 90 is mounted between auxiliary rings 93 and and 92. The inner bars 95 extend from the hub to the intermediate ring 96, while the bars 97 extend therefrom to the auxiliary rings 93 and 94, being entire or in parts as desired. The core 90 collects the magnetic flux at the outer ends of the rotor bars so as to intensify the voltage, the core acting as a magnet and intensifying the magnetic flux between adjacent fields.

It will be understood that while the rotor bars are all shown radial to the shaft that this is not necessary, as they may be at any desired angle, but convenience in manufacturing will usually cause them to be radial.

The details and proportions of the several parts may all be changed by those skilled in the art without departing from the spirit of our invention as set forth in the following claims.

We claim:—

1. In an electric machine, the combination of a shaft, a series of magnet holders mounted co-axially with the shaft, a series of electro-magnets mounted in each holder, each magnet having cores parallel to the shaft and all being so wound that the magnetic flux is in the same direction, and rotors between the magnet holders and comprising bars extending from the shaft and collector rings connected to the outer ends of the bars.

2. In an electric machine, the combination of a shaft and supports therefor, a series of magnet holders mounted co-axially of the shaft, a series of electro-magnets mounted in each holder, each magnet having the ends of its cores segmental so that the cores constitute complete rings when secured together, and rotors mounted on the shaft between the magnets.

3. In an electric machine, the combination of a shaft and supports therefor, a series of magnet holders mounted coaxially of the shaft, a series of electro-magnets mounted in each holder, each magnet having the ends of its cores segmental so that the cores constitute complete rings when secured together, and rotors mounted on the shaft between the magnets, the cores being grooved between their ends to receive the windings which are of less thickness than the depth of the grooves thus leaving air passages, the holders being formed with ventilating openings connecting to said passages.

4. In an electric machine, the combination of a series of spaced annular field pieces in axial alinement with their ends parallel, a shaft extending through the field pieces, bars extending from the shaft between the field pieces, rings connecting the ends of the bars, and electric conductors connecting to the ends of the bars, said bars being in groups positioned in diagonal rows.

5. In an electric machine, the combination of a series of spaced annular field pieces formed of segment shaped electro-magnets and circumferential bands to hold the magnets together, said field pieces being formed with radial and circumferential air passages, and with parallel faces, a shaft extending through the centers of the field pieces, and rotors mounted on the shaft.

6. In an electric machine, the combination of a series of spaced annular field pieces in axial alinement with their ends parallel, iron heads in engagement with the outer ends of the outer field pieces, an iron housing encasing the field pieces and connecting to the heads, a shaft extending through the field pieces and heads, and rotors mounted on the shaft between the field pieces, said rotors comprising hubs and circumferential rings and radial bars in groups positioned in diagonal rows.

7. In an electric machine, the combination of a series of spaced annular field pieces in axial alinement, a hollow shaft extending through the field pieces, a series of hubs mounted on said shaft, bars extending outwardly therefrom in groups between the field pieces and arranged in diagonal rows, conductor wires within the shaft connected to said hubs, a collector ring connecting the outer ends of the bars from each hub, a housing for the field pieces, contact rollers mounted within the housing in engagement with the collector rings, contact rings mounted on the shaft in connection with the conductor wires, contact rollers in engagement with the contact rings, and lead wires connected to said rollers.

8. In an electric machine, the combination of a series of spaced annular field pieces formed of similar segment shaped electromagnets provided with similar windings so that the magnetic flux of all the magnets is parallel and in the same direction, circular bands to secure the magnets into field pieces, iron heads in engagement with the outer ends of the outer field pieces and an iron housing encasing the field pieces and connecting to the heads to constitute a return path for the magnetic flux of the field pieces, a shaft extending through the field pieces, and rotors mounted on the shaft between the fields and embodying bars and collector rings connecting the outer ends of the bars.

9. In an electric machine, a series of magnetic fields each formed of a group of electro-magnets, said electro-magnets formed with grooves to constitute air passages, and magnet holders to secure the magnets together to constitute said field pieces, said holders being provided with air passages connecting to the air passages between the magnets.

AMEL B. BROLUSKA.
HARRY A. BROLUSKA.